(12) United States Patent
Davis et al.

(10) Patent No.: US 8,387,409 B2
(45) Date of Patent: *Mar. 5, 2013

(54) SANITIZED WATER DISPENSER

(75) Inventors: Kenneth A. Davis, Mandeville, LA (US); James J. Shelton, Alpine, TX (US)

(73) Assignee: S.I.P. Technologies L.L.C., New Orleans, LA (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/830,918

(22) Filed: Jul. 6, 2010

(65) Prior Publication Data

US 2011/0006085 A1    Jan. 13, 2011

Related U.S. Application Data

(60) Division of application No. 11/457,365, filed on Jul. 13, 2006, now Pat. No. 7,748,233, which is a continuation-in-part of application No. 09/996,328, filed on Nov. 28, 2001, now Pat. No. 7,175,054, which is a continuation-in-part of application No. 09/881,796, filed on Jun. 15, 2001, now Pat. No. 6,561,382, and a continuation-in-part of application No. 09/954,849, filed on Sep. 18, 2001, now Pat. No. 6,532,760, which is a continuation of application No. 09/472,320, filed on Dec. 23, 1999, now Pat. No. 6,289,690, which is a continuation-in-part of application No. 09/220,554, filed on Dec. 23, 1998, now Pat. No. 6,085,540, said application No. 11/457,365 is a continuation-in-part of application No. 10/173,133, filed on Jun. 17, 2002, now abandoned, which is a continuation-in-part of application No. 09/996,328, filed on Nov. 28, 2001, now Pat. No. 7,175,054, which is a continuation-in-part of application No. 09/881,796, filed on Jun. 15, 2001, now Pat. No. 6,561,382.

(51) Int. Cl.
*F25D 3/00* (2006.01)
*B67D 7/76* (2010.01)

(52) U.S. Cl. ............... 62/392; 62/389; 222/190

(58) Field of Classification Search ............... 62/392, 62/318, 389; 222/190, 146.6, 129.1
See application file for complete search history.

(56) References Cited

U.S. PATENT DOCUMENTS

| | | | |
|---|---|---|---|
| 2,297,248 A | 9/1942 | Rudolph | |
| 3,007,334 A | 11/1961 | Paul | |
| 3,166,615 A | 1/1965 | Farrell | |
| 3,238,056 A | 3/1966 | Paul et al. | |
| 3,246,767 A | 4/1966 | Paul et al. | |
| 3,353,682 A | 11/1967 | Paul et al. | |
| 3,416,776 A | 12/1968 | Gamer | |
| 3,520,418 A | 7/1970 | Guinard | |
| 3,538,020 A | 11/1970 | Heskett et al. | |
| 3,603,509 A | 9/1971 | Nechine | |
| 3,644,231 A | 2/1972 | Maruya et al. | |
| 3,825,640 A | 7/1974 | Maierson | |
| 3,978,176 A | 8/1976 | Voegeli | |
| 4,082,893 A | 4/1978 | Okita | |
| 4,382,867 A | 5/1983 | Schmit et al. | |
| 5,262,096 A | 11/1993 | Egashira | |
| 5,422,043 A | 6/1995 | Burris | |
| 5,431,861 A | 7/1995 | Nagahiro et al. | |
| 5,683,576 A | 11/1997 | Olsen | |
| 5,858,283 A | 1/1999 | Burris | |
| 6,289,690 B1 * | 9/2001 | Davis | 62/392 |
| 6,481,219 B2 | 11/2002 | Palermo | |
| 6,532,760 B2 * | 3/2003 | Davis | 62/392 |
| 6,561,382 B2 | 5/2003 | Shelton | |
| 6,568,900 B2 | 5/2003 | Conrad et al. | |
| 7,175,054 B2 * | 2/2007 | Davis et al. | 222/190 |
| 7,748,233 B2 | 7/2010 | Davis et al. | |

\* cited by examiner

*Primary Examiner* — Chen-Wen Jiang
(74) *Attorney, Agent, or Firm* — Garvey, Smith, Nehrbass & North, L.L.C.; Charles C. Garvey, Jr.; Vanessa M. D'Souza

(57) ABSTRACT

A method and apparatus for sanitizing a water dispenser that dispenses water for human consumption is disclosed. The dispenser can be in the form of any dispenser that dispenses water for human consumption employing a reservoir that dispenses water through one or more spigots. Water in the reservoir is sanitized with an air/ozone gas mixture that is transmitted to a porous polymeric diffuser having a central bore and a porous wall. The porosity of the porous wall defines bubble size.

11 Claims, 1 Drawing Sheet

US 8,387,409 B2

SANITIZED WATER DISPENSER

CROSS-REFERENCE TO RELATED APPLICATIONS

This is a divisional of U.S. patent application Ser. No. 11/457,365, filed 13 Jul. 2006 (issuing as U.S. Pat. No. 7,748,233), which is a continuation-in-part of co-pending U.S. patent application Ser. No. 09/996,328, filed on 28 Nov. 2001, now U.S. Pat. No. 7,175,054, which is a continuation-in-part of U.S. patent application Ser. No. 09/881,796, filed on 15 Jun. 2001, published as 2003-0000966 A1 on 2 Jan. 2003, now U.S. Pat. No. 6,561,382, and a continuation-in-part of U.S. patent application Ser. No. 09/954,849, filed on 18 Sep. 2001, published as 2002-0069664 A1 on 13 Jun. 2002, now U.S. Pat. No. 6,532,760, which is a continuation of U.S. patent application Ser. No. 09/472,320, filed on 23 Dec. 1999, now U.S. Pat. No. 6,289,690, which is a continuation-in-part of U.S. patent application Ser. No. 09/220,554, filed on 23 Dec. 1998, now U.S. Pat. No. 6,085,540, each of which are incorporated herein by reference.

U.S. patent application Ser. No. 11/457,365, filed 13 Jul. 2006 (issuing as U.S. Pat. No. 7,748,233), is also a continuation-in-part of co-pending U.S. patent application Ser. No. 10/173,133, filed on 17 Jun. 2002, and published as 2003-0071069 A1 on 17 Apr. 2003, which is a continuation-in-part of U.S. patent application Ser. No. 09/996,328, filed on 28 Nov. 2001, now U.S. Pat. No. 7,175,054, which is a continuation-in-part of U.S. patent application Ser. No. 09/881,796, filed on 15 Jun. 2001, published as 2003-0000966 A1 on 2 Jan. 2003, now U.S. Pat. No. 6,561,382, each of which are incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to sanitized water dispensers. More particularly, the present invention relates to a method and apparatus for dispensing ozone to the reservoir of a water dispenser that dispenses water for human consumption, wherein an improved diffuser of an ozone resistant porous polymer material receives ozone gas and dispenses very tiny bubbles into the water contained in the reservoir.

2. General Background of the Invention

Patents have issued for systems that dispense ozone to a water dispenser so that the ozone sanitizes any water that it is to be subsequently dispensed to and consumed by a user.

Other patents have issued that relate to polymeric diffuser materials.

The following U.S. patents of Table 1 are possibly relevant to the present invention and incorporated herein by reference:

TABLE 1

| PAT. NO. | TITLE | ISSUE DATE MM-DD-YYYY |
|---|---|---|
| 2,297,248 | Porous Materials and Process of Making | 09-29-1942 |
| 3,007,334 | Method and Apparatus for determining the Maximum Pore Size of Hydraulic Filter Elements | 11-07-1961 |
| 3,166,615 | Method of Forming Porous Rigid Structures | 01-19-1965 |
| 3,238,056 | Microporous Materials and Process of Making the Same | 03-01-1966 |
| 3,246,767 | Fluid-Permeable Materials and Process of Making the Same | 04-19-1966 |
| 3,353,682 | Fluid-Permeable Fibrous Multilayer Materials and Process of Making the Same | 11-21-1967 |
| 3,416,776 | Device for Aerating, Preferably, Waste Water | 12-17-1968 |
| 3,520,418 | Filter Elements and the Manufacture Thereof | 07-14-1970 |
| 3,538,020 | Fluid Purification Device Containing a Cartridge of Polymer Entrapped Aggregate Particles | 11-03-1970 |
| 3,603,509 | Gas Dispersing Apparatus | 09-07-1971 |
| 3,644,231 | Porous Member for Diffusing Air and Process for Producing the Same | 02-22-1972 |
| 3,825,640 | Process for Manufacturing a Porous, Solid, Article | 07-23-1974 |
| 3,978,176 | Sparger | 08-31-1976 |
| 4,082,893 | Porous Polytetrafluoroethylene Tubings and Process of Producing Them | 04-04-1978 |
| 4,382,867 | In Place Gas Cleaning of Diffusion Elements | 05-10-1983 |
| 5,262,096 | Gas Diffusion Article | 11-16-1993 |
| 5,422,043 | Diffuser and Diffusing Method Using Dual Surface Tensions | 06-06-1995 |
| 5,431,861 | Method and Apparatus for Producing a High Concentration Ozone Water Solution | 07-11-1995 |
| 5,858,283 | Sparger | 01-12-1999 |
| 5,863,576 | Water Ozonation Treatment Apparatus | 11-04-1997 |
| 6,481,219 | Disinfection System and Method of Using Same | 11-19-2002 |
| 6,561,382 | Method and Apparatus for Disinfecting a Water Cooler and its Dispensing Spigot(s) | 05-13-2003 |
| 6,568,900 | Pressure Swing Contactor for the Treatment of a Liquid with a Gas | 05-27-2003 |

Some porous polymer gas diffuser materials have been used in an air to water diffusion environment such as in an aquarium. One such aquarium air diffuser device is sold by Regent Pet Products of Moore Park, Calif. and sold under the trademarks Aquatech™, and Bubble Curtain™.

Incorporated herein by reference are all of our prior patents, patent applications, and published patent applications, including the following:

U.S. patent application Ser. No. 11/457,365, filed 13 Jul. 2006, issuing as U.S. Pat. No. 7,748,233; U.S. patent application Ser. No. 09/220,554, filed on Dec. 23, 1998, now U.S. Pat. No. 6,085,540; PCT/US99/27248, filed on Nov. 17, 1999, and published as WO 2000/38815 on Jul. 6, 2000; U.S. patent application Ser. No. 09/472,320, filed on Dec. 23, 1999, now U.S. Pat. No. 6,289,690; U.S. patent application Ser. No. 09/881,796, filed on Jun. 15, 2001, published as 2003-0000966 A1 on Jan. 2, 2003, now U.S. Pat. No. 6,561,382; U.S. patent application Ser. No. 09/954,849, filed on Sep. 18, 2001, published as 2002-0069664 A1 on Jun. 13, 2002, now U.S. Pat. No. 6,532,760; PCT/US02/19158, filed on Jun. 17, 2002, and published as WO 2002/02706 on Dec.

27, 2002; U.S. patent application Ser. No. 10/463,870, filed on Jun. 17, 2003, and published as 2004-0074252 A1 on Apr. 22, 2004, which claims priority from U.S. provisional application No. 60/389,439, filed on Jun. 18, 2002, now expired; U.S. patent application Ser. No. 10/875,078, filed on Jun. 23, 2004, and published as 2005-0087554 A1 on Apr. 28, 2005; U.S. patent application Ser. No. 10/967,812, filed on Oct. 16, 2004, which claims priority from U.S. provisional application No. 60/511,986, filed on Oct. 16, 2003, now expired; and U.S. patent application Ser. No. 11/109,913, filed on Apr. 20, 2005, and published as 2005-0236432 A1 on 10-27-2005, which claims priority from U.S. provisional application No. 60/564,178, now expired; PCT/US05/14118, filed on Apr. 21, 2005.

BRIEF SUMMARY OF THE INVENTION

The present invention relates to the use of commonly available, inexpensive, food grade porous polymer gas diffuser materials as part of an overall method and apparatus for sanitizing a water dispenser with ozone gas.

A diffuser ring is supported with a plurality of supports or stand-offs that can be made of a food grade ozone resistant elastomeric material such as silicone, Tygon® or Viton®.

Each of these supports or stand-off provides a radiused base that conforms to the reservoir basal corner curvature. Each support can be secured to a diffuser that is elongated, hollow and tubular in transverse cross section and circular in shape, tracking the wall of a cylindrically shaped reservoir. Food grade silicone sealer or epoxy can be used to join the stand-offs or supports to the elongated ring diffuser.

The elongated porous polymeric diffuser has a memory and thus can function as a spring, attempting to return to a straight configuration so that it holds the stand-offs or support against the sidewall of the reservoir. The diffuser has a bore that is surrounded by a porous polymeric wall.

The material that forms the diffuser is of a porous polymer material that is highly resistant to ozone degradation over extended periods of time. The ozone is diffused through the ring diffuser wall. This diffused ozone preferably has a small concentration of ozone of at least up to about 0.5% by weight ozone in air.

The diffuser can be made of compressed glass or mineral or ozone resistant polymer fiber like polypropylene matting or mesh impregnated with thermo-setting resins that shrink on curing, leaving fine pores between spaces in the mesh or matting.

The importance of these food grade porous polymer fiber composite materials to ozone gas diffusion in cost sensitive micro-skill applications stems from their low cost, lower pressure loss, resistance to ozone, resistance to biofilming and pore fouling, ease of bubble size and pressure loss alteration, ease of formation and thermal bending at either an uncured or cured state to achieve complex shapes of small space saving tubing diameter into the preferred ring or rectangular diffusers, rigidity, flexibility toughness and impact resistance, thinness and lightweight.

These desirable features of the diffuser of the present invention place them apart from more costly, high thermal formation temperature, highly process intensive, conventional ozone industry standard brittle and low impact resistant diffuser materials consisting of porous centered metal and ceramics.

Past difficulties experienced with these conventional higher weight materials, such as an inability to meet necessary price points, material properties quality control during manufacture, breakage in manufacture, shipping and installation has dictated the need for less problematic materials capable of producing like or better properties.

The porous resin bonded fibrous composite materials of the present invention meet the necessary criteria for ozone diffusion in micro-skill applications such as water dispenser sanitation designed to drastically reduce the sanitary maintenance cost of water dispensers.

The method and apparatus of the present invention provides a cost effectiveness such that the diffuser can be classified as a quick change, throw away and replace material when fouled. This eliminates the problem of scheduled maintenance in acid and acid gas bleaching and cleaning that is required for the more expensive porous metal and ceramic diffusers.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
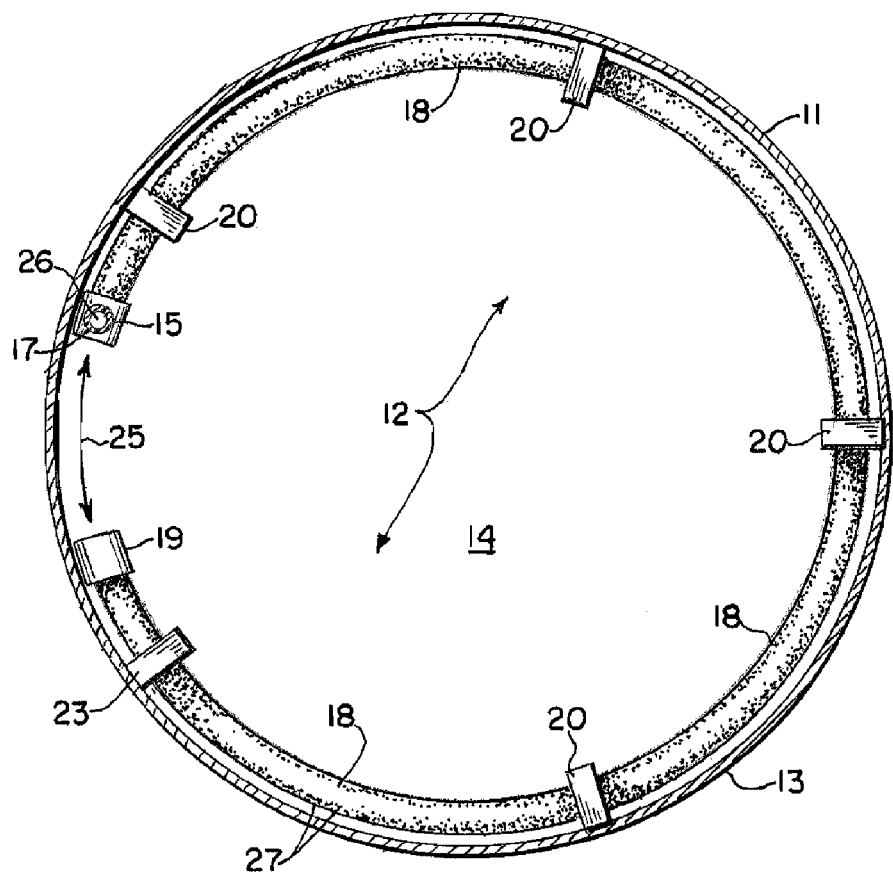
FIG. 1 is a partial plan view of a preferred embodiment of the apparatus of the present invention.
Figure 2:
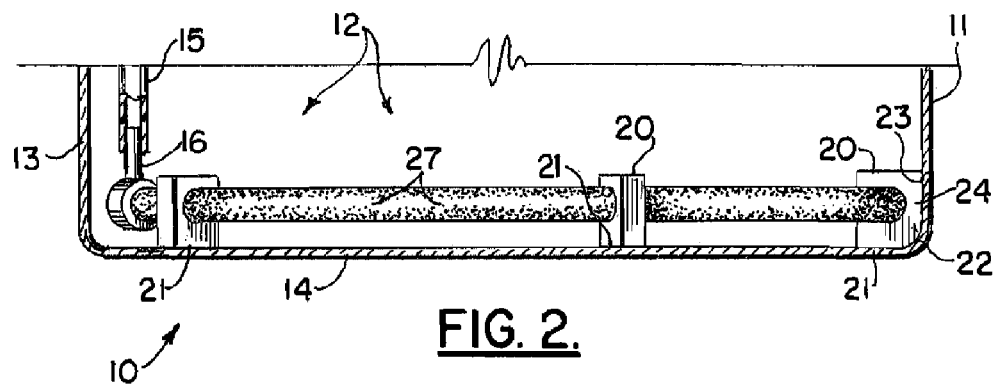
FIG. 2 is a side elevation view of a preferred embodiment of the apparatus of the present invention.

FIGS. 1 and 2 show a preferred embodiment of the apparatus of the present invention designated generally by the numeral 10. Sanitized water dispenser 10 can be used with any water dispenser such as the inverted bottle type dispenser that is commonly sold nationwide such as Oasis® water coolers or dispensers for example. The dispenser can be any other dispenser for dispensing water for human consumption such as point of use types. Such a water dispenser can be seen generally in the Davis U.S. Pat. Nos. 6,085,540; 6,289,690 and 6,532,760 or the Shelton U.S. Pat. No. 6,561,382, each of which is hereby incorporated herein by reference.

Such a water dispenser per se is known having a cabinet housing a water containing reservoir, spigots for dispensing water from the reservoir to be consumed, a water supply for refilling the reservoir and in some versions a cooling system for refrigerating water that is contained in the reservoir or a heating system for heating water that flows from the reservoir.

In FIG. 2, a reservoir 11 is shown and for purposes of clarity without the other known components of a water dispenser such as those shown and described with respect to the above referenced Davis and Shelton patents.

Reservoir 11 has an interior 12. The reservoir 11 can provide a sidewall 13 that is preferably cylindrically shaped and a bottom wall 14. A curved corner 24 can be used to interface sidewall 13 and bottom wall 14.

An influent flow line 15 is an influent gas flow line that can be used to transport ozone (e.g. in a mixture with air) from a position within the cabinet of the water dispenser 10 or from a location next to the cabinet of the water dispenser 10. Influent gas flow line 15 connects to porous polymeric diffuser 18 with end cap 17 having stab fitting 16. The porous polymeric diffuser 18 is an elongated hollowed, tubular structure having a bore 26 that conveys an ozone or ozone and air mixture between end cap 17 and end cap 19.

Because the diffuser 18 is a porous polymeric material, it provides a large plurality of small pores 27 through which ozone and air in a mixture diffuse and then contact water contained in the interior 12 of reservoir 11. Diffuser 18 is thus contained within reservoir 11 below its water surface.

The porous polymeric diffuser 18 is supported with a plurality of supports 20, each having a bottom surface 21 and a vertical side surface 23. A curved corner surface 22 connects the surfaces 21, 23 and is sized and shaped to fit closely to and conform to the corner 24 of reservoir 11 as shown in FIG. 2.

Supports 20 are spaced circumferentially about reservoir 11, each preferably contacting sidewall 13 and bottom wall 14 as shown in FIG. 2. The diffuser 18 has a memory and can be manufactured as a straight tubular member and later bent into the shape shown in FIG. 1 for installation. Arrow 25 thus illustrates that the diffuser 18 is attempting to return to its original linear shape thus providing a spring action for holding each of the supports 20 against the wall 13 of the reservoir 11.

The following is a list of parts and materials suitable for use in the present invention.

PARTS LIST

| Part Number | Description |
| --- | --- |
| 10 | sanitized water dispenser |
| 11 | reservoir |
| 12 | interior |
| 13 | side wall |
| 14 | bottom wall |
| 15 | influent gas flow line |
| 16 | stab fitting |
| 17 | end cap |
| 18 | porous polymeric diffuser |
| 19 | end cap |
| 20 | support |
| 21 | bottom surface |
| 22 | curved corner surface |
| 23 | vertical side surface |
| 24 | corner |
| 25 | arrow |
| 26 | bore |
| 27 | pore |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A cooled water dispenser, comprising:
   a) a cabinet having a contained water dispensing system that includes a water source, a reservoir, a porous diffuser having pores for emitting ozone bubbles, and a dispensing spigot;
   b) an ozone generator housing supported by the cabinet, said housing having an ozone generator inside the housing and air flow lines for transmitting air to and from the housing interior;
   c) a blower for generating air flow;
   d) a first air flow line connecting the blower and the housing interior;
   e) a second air flow line connecting the housing interior with the porous diffuser;
   f) means for adding ozone to the water dispensing system when the spigot is operated, said means including the ozone generator, blower, porous diffuser, and flow lines; and
   g) wherein the diffuser generates bubbles of a size that is defined by the size of the pores of the diffuser.

2. The water dispenser of claim 1 wherein the diffuser is a ring positioned around the side of the reservoir at the bottom of the reservoir.

3. The water dispenser of claim 2 wherein the diffuser ring is generally circular.

4. The water dispenser of claim 2 wherein the reservoir has a center portion and the diffuser ring has openings positioned to direct air emissions from the center portion of the reservoir.

5. The water dispenser of claim 2 wherein the reservoir includes a generally vertical sidewall and the diffuser ring is positioned to discharge bubbles against the sidewall so that the sidewall is scrubbed with ozone bubbles during use.

6. The water dispenser of claim 1 wherein the ozone generator generates sufficient ozone to sterilize the water in the reservoir by bubbling air upwardly a distance of just a few inches.

7. The water dispenser of claim 6 wherein bubbles rise upwardly a distance of between about two and ten inches.

8. The water dispenser of claim 6 wherein bubbles rise upwardly a distance of between about four and eight inches.

9. The water dispenser of claim 1 further comprising means for enabling the ozone generator to continue to generate air flow into said ozone generator housing and air diffuser via first and second air flow lines for selected time after the ozone generator has been deactivated.

10. The water dispenser of claim 1 further comprising a transformer for generating high voltage electricity for the ozone generator.

11. The water dispenser of claim 1 further comprising a replenishing means that includes a central water inlet and the diffuser ring is spaced horizontally away from the water inlet.

* * * * *